US011683459B2

(12) United States Patent
Sandow

(10) Patent No.: US 11,683,459 B2
(45) Date of Patent: *Jun. 20, 2023

(54) OBJECT FEATURE VISUALIZATION APPARATUS AND METHODS

(71) Applicant: Material Technologies Corporation, New York, NY (US)

(72) Inventor: Adam I. Sandow, Boca Raton, FL (US)

(73) Assignee: Material Technologies Corporation, Boca Raton, FL (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/010,971

(22) Filed: Sep. 3, 2020

(65) Prior Publication Data
US 2021/0067752 A1 Mar. 4, 2021

Related U.S. Application Data

(60) Provisional application No. 62/895,769, filed on Sep. 4, 2019.

(51) Int. Cl.
*G06T 7/73* (2017.01)
*H04N 9/31* (2006.01)
(Continued)

(52) U.S. Cl.
CPC ........... *H04N 9/3194* (2013.01); *G03B 21/14* (2013.01); *G06F 3/00* (2013.01); *G06Q 30/00* (2013.01);
(Continued)

(58) Field of Classification Search
None
See application file for complete search history.

(56) References Cited

U.S. PATENT DOCUMENTS 1,322,290 A 11/1919 Cibulka
1,856,634 A 5/1932 Hartig
(Continued)

FOREIGN PATENT DOCUMENTS

CN 202206470 U * 4/2012
DE 102010007037 8/2011
(Continued)

OTHER PUBLICATIONS

U.S. Appl. No. 17/463,223, filed Aug. 31, 2021, Sandow.
(Continued)

*Primary Examiner* — Yi Wang
(74) *Attorney, Agent, or Firm* — Brownstein Hyatt Farber Schreck, LLP

(57) ABSTRACT

An object feature visualization system is disclosed. The system may include a computing device that generates video-mapped images to project onto physical objects. The video-mapped images may include features to be projected onto the objects. The projection of a video-mapped image onto the physical object allows for the visualization of the feature on the object. In some examples, the computing device receives a feature selection for a particular object, and generates a video-mapped image with the selected feature to provide to a projector to project the video-mapped image onto the physical object. In some examples, a user is able to select one or more features for one or more objects of a room display via a user interface. The system then projects video-mapped images with the selected features onto the physical objects. The system may allow a user to save feature selections, and to purchase or request additional information about objects with selected features.

20 Claims, 11 Drawing Sheets

(51) Int. Cl.

| | | |
|---|---|---|
| *G03B 21/14* | (2006.01) | |
| *G06F 3/00* | (2006.01) | |
| *G06Q 30/00* | (2023.01) | |
| *G06T 15/00* | (2011.01) | |
| *G06T 11/40* | (2006.01) | |
| *G06T 15/04* | (2011.01) | |

(52) U.S. Cl.
CPC ............... *G06T 7/73* (2017.01); *G06T 11/40* (2013.01); *G06T 15/00* (2013.01); *G06T 15/04* (2013.01); *H04N 9/3179* (2013.01)

(56) References Cited

U.S. PATENT DOCUMENTS

| | | |
|---|---|---|
| 1,922,354 A | 8/1933 | Burke |
| 2,728,450 A | 12/1955 | Haire |
| 2,771,237 A | 11/1956 | Philipson |
| 2,822,973 A | 2/1958 | Armstrong |
| 3,301,621 A | 1/1967 | Stephenson |
| 3,991,902 A | 11/1976 | Ford, Jr. |
| 4,067,493 A | 1/1978 | Stavin |
| 4,290,524 A | 9/1981 | Azar |
| 4,369,882 A | 1/1983 | Schluger |
| 4,669,610 A | 6/1987 | Lindsey et al. |
| 4,711,348 A | 12/1987 | Schluger |
| 4,838,425 A | 6/1989 | O'Brien et al. |
| 5,022,522 A | 6/1991 | Kennedy |
| 5,209,349 A | 5/1993 | Porter et al. |
| 5,716,075 A | 2/1998 | Evert, Jr. |
| 5,762,191 A | 6/1998 | Etzion |
| 6,112,900 A | 9/2000 | Adkins, Jr. |
| 7,070,055 B2 | 7/2006 | Lechanoine et al. |
| 7,264,123 B2 | 9/2007 | Reed |
| 7,604,354 B1* | 10/2009 | Ligon .................... G03B 21/28 353/30 |
| 7,621,402 B2 | 11/2009 | Sandow |
| 8,292,733 B2 | 10/2012 | Crawford et al. |
| 8,295,555 B2 | 10/2012 | Campbell, Jr. et al. |
| 8,699,787 B2 | 4/2014 | Van Den Hengel |
| 9,035,966 B2 | 5/2015 | Rice et al. |
| 9,352,888 B2 | 5/2016 | Scott |
| 9,365,337 B2 | 6/2016 | Fullan |
| 9,429,421 B2 | 8/2016 | Kessler |
| 9,483,853 B2 | 10/2016 | Coon |
| 9,631,773 B2 | 4/2017 | Gehlhausen |
| 10,475,250 B1 | 11/2019 | Huang et al. |
| 10,875,697 B2 | 12/2020 | Sandow |
| 11,062,383 B2 | 7/2021 | Holt et al. |
| 2003/0066766 A1 | 4/2003 | Lechanoine et al. |
| 2004/0089579 A1 | 5/2004 | Berliner et al. |
| 2005/0247597 A1 | 11/2005 | Reed |
| 2007/0051651 A1 | 3/2007 | Marom |
| 2009/0299960 A1 | 12/2009 | Lineberger |
| 2010/0278761 A1 | 11/2010 | Samain |
| 2010/0284607 A1 | 11/2010 | Van Den Hengel |
| 2011/0053688 A1* | 3/2011 | Crawford .................. A63D 5/04 463/31 |
| 2012/0128241 A1 | 5/2012 | Jung |
| 2013/0342575 A1 | 12/2013 | Coon |
| 2014/0069059 A1 | 3/2014 | Scott |
| 2014/0375674 A1 | 12/2014 | Rice et al. |
| 2015/0316985 A1* | 11/2015 | Levesque .............. G06T 19/006 345/156 |
| 2016/0018970 A1* | 1/2016 | Chaudhri ............ G06F 3/04842 715/815 |
| 2016/0033262 A1 | 2/2016 | Kessler |
| 2016/0210602 A1 | 7/2016 | Siddique et al. |
| 2017/0018094 A1 | 1/2017 | Todeschini |
| 2017/0200314 A1 | 7/2017 | Jeong |
| 2017/0330273 A1* | 11/2017 | Holt ...................... H04N 9/3173 |
| 2018/0182174 A1* | 6/2018 | Choi ...................... G02B 30/27 |
| 2019/0121522 A1 | 4/2019 | Davis |
| 2020/0380762 A1 | 12/2020 | Karafin |
| 2021/0067750 A1 | 3/2021 | Sandow |
| 2021/0392307 A1 | 12/2021 | Sandow |
| 2021/0400245 A1 | 12/2021 | Sandow |

FOREIGN PATENT DOCUMENTS

| | | |
|---|---|---|
| JP | 2019053450 | 4/2019 |
| WO | WO 11/015672 | 2/2011 |
| WO | 2019/106095 | 6/2019 |

OTHER PUBLICATIONS

U.S. Appl. No. 17/463,278, filed Aug. 31, 2021, Sandow.
International Search Report and Written Opinion dated Oct. 22, 2020, PCT/US2020/049101, 6 pages.

* cited by examiner

OBJECT FEATURE VISUALIZATION APPARATUS AND METHODS

CROSS-REFERENCE TO RELATED APPLICATIONS

This application claims the benefit of U.S. Provisional Patent Application No. 62/895,769, filed Sep. 4, 2019, and entitled "OBJECT FEATURE VISUALIZATION APPARATUS AND METHODS," which is hereby incorporated by reference in its entirety.

FIELD OF THE INVENTION

The disclosure relates generally to systems for interior and exterior design and, more particularly, to the digital display of objects for interior and exterior design.

BACKGROUND

Manufacturers and suppliers of design materials, such as fabrics, flooring, paints, housewares, or any other design materials, often times display images of their materials for advertising purposes. For example, the design materials may be advertised to potential clients such as designers (e.g., interior or exterior designers) as well as end users (e.g., homeowners, businesses, etc.). Images of the materials may be displayed in magazines such as industry magazines, in showrooms, or at conferences, for example. Images of the materials may be also displayed on a website, such as a manufacturer's or supplier's website. In some examples, videos that include the design materials may be displayed. For example, a manufacturer or supplier of a design material may display a promotional video of their design materials to potential clients in a showroom.

SUMMARY

In some examples, a computing device includes at least one processor. The at least one processor is configured to receive first data identifying a selection of at least one feature for at least one object. In response to receiving the first data, the at least one processor is configured to obtain a video-mapped image characterizing the at least one object with the at least one feature. The at least one processor is also configured to provide the video-mapped image to at least one projecting device, where the projecting device is configured to project the video-mapped image onto the at least one object.

In some examples, a system includes a room display, a projecting device configured to project images onto the room display, and a computing device communicatively coupled to the projecting device. The computing device is configured to display an image of a scene including at least one object. The computing device is further configured to receive first data identifying a selection of the at least one object and, in response to the received first data, provide for display a plurality of feature categories for the at least one object. The computing device is also configured to receive second data identifying a selection of a first feature category of the plurality of feature categories. In response to the received second data, the computing device is configured to provide for display a plurality of features corresponding to the first feature category. Further, the computing device is configured to receive third data identifying a selection of a first feature of the plurality of features corresponding to the first feature category and, in response to the received third data, obtain a video-mapped image characterizing the at least one object with the first feature. The computing device is also configured to provide the obtained video-mapped image to the projecting device.

In some examples, a method includes receiving first data identifying a selection of at least one feature for at least one object. The method also includes, in response to receiving the first data, obtaining a video-mapped image characterizing the at least one object with the at least one feature. Further, the method includes providing the video-mapped image to at least one projecting device, where the projecting device is configured to project the video-mapped image onto the at least one object.

In some examples, a method includes displaying an image of a scene including at least one object. The method also includes receiving first data identifying a selection of the at least one object and, in response to the received first data, providing for display a plurality of feature categories for the at least one object. The method further includes receiving second data identifying a selection of a first feature category of the plurality of feature categories. In response to the received second data, the method includes providing for display a plurality of features corresponding to the first feature category. Further, the method includes receiving third data identifying a selection of a first feature of the plurality of features corresponding to the first feature category and, in response to the received third data, obtaining a video-mapped image characterizing the at least one object with the first feature. The method also includes providing the obtained video-mapped image to the projecting device.

In some examples, a non-transitory, machine-readable storage medium stores instructions that, when executed by at least one processor, cause the at least one processor to perform operations including receiving first data identifying a selection of at least one feature for at least one object. The operations also include, in response to receiving the first data, obtaining a video-mapped image characterizing the at least one object with the at least one feature. Further, the operations include providing the video-mapped image to at least one projecting device, where the projecting device is configured to project the video-mapped image onto the at least one object.

In some examples, a non-transitory, machine-readable storage medium stores instructions that, when executed by at least one processor, cause the at least one processor to perform operations including receiving first data identifying a selection of the at least one object and, in response to the received first data, providing for display a plurality of feature categories for the at least one object. The operations further include receiving second data identifying a selection of a first feature category of the plurality of feature categories. In response to the received second data, the operations include providing for display a plurality of features corresponding to the first feature category. Further, the operations include receiving third data identifying a selection of a first feature of the plurality of features corresponding to the first feature category and, in response to the received third data, obtaining a video-mapped image characterizing the at least one object with the first feature. The operations also include providing the obtained video-mapped image to the projecting device.

BRIEF DESCRIPTION OF THE DRAWINGS

The features and advantages of the present disclosures will be more fully disclosed in, or rendered obvious by the following detailed descriptions of example embodiments.

The detailed descriptions of the example embodiments are to be considered together with the accompanying drawings wherein like numbers refer to like parts and further wherein.

DETAILED DESCRIPTION

Figure 1:
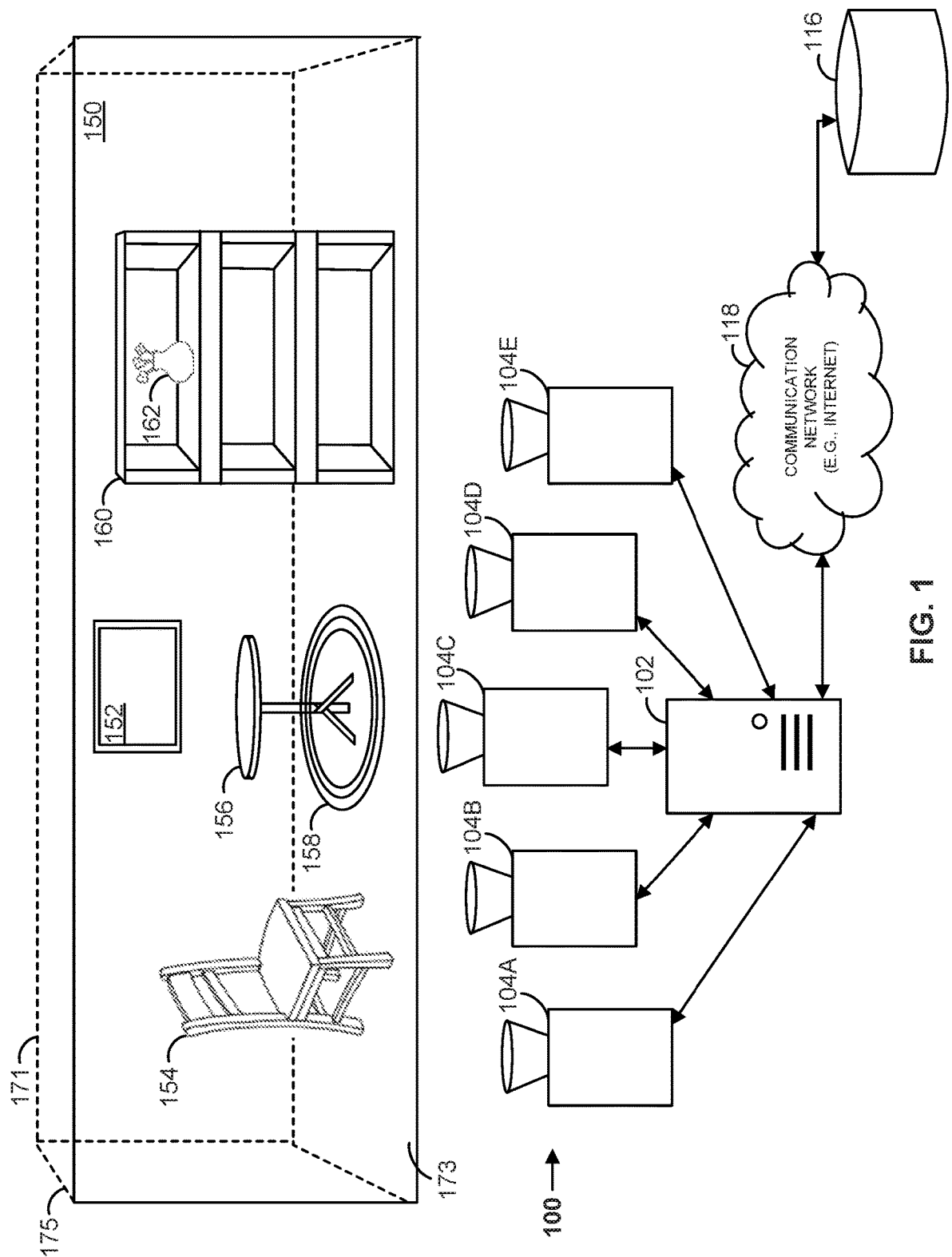
FIG. 1 illustrates an object feature visualization system in accordance with some embodiments.

The description of the preferred embodiments is intended to be read in connection with the accompanying drawings, which are to be considered part of the entire written description of these disclosures. It should be understood, however, that the present disclosure is not intended to be limited to the particular forms disclosed. Rather, the present disclosure covers all modifications, equivalents, and alternatives that fall within the spirit and scope of these exemplary embodiments.

In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 shows a block diagram of an object feature visualization system 100 that includes an object feature visualization computing device 102, a plurality of projectors 104A, 104B, 104C, 104D, 104E, and a database 116. Each projector may be, for example, a digital light processing (DLP) projector, a liquid crystal display (LCD) projector, or any other suitable image projecting device. Although in this example five projectors 104 are shown, in other examples a differing number of projectors may be employed by the object feature visualization system 100. Object feature visualization computing device 102 may be communicatively coupled to database 116 via communication network 118. Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet. Object feature visualization computing device 102 may transmit data to, and receive data from, communication network 118.

Object feature visualization computing device 102 may also be communicatively coupled to projectors 104, such as via a wired or wireless network. Although not indicated, in some examples object feature visualization computing device 102 is communicatively coupled to projectors 104 via communication network 118.

Object feature visualization computing device 102 may include hardware or hardware and software for processing and handling information. For example, object feature visualization computing device 102 may include one or more processors, one or more field-programmable gate arrays (FPGAs), one or more application-specific integrated circuits (ASICs), one or more state machines, digital circuitry, or any other suitable circuitry. In some examples, object feature visualization computing device 102 may be, for example, a web server, an application server, a cloud-based server, a workstation, a laptop, a tablet, a mobile device such as a cellular phone, or any other suitable computing device.

Figure 2:
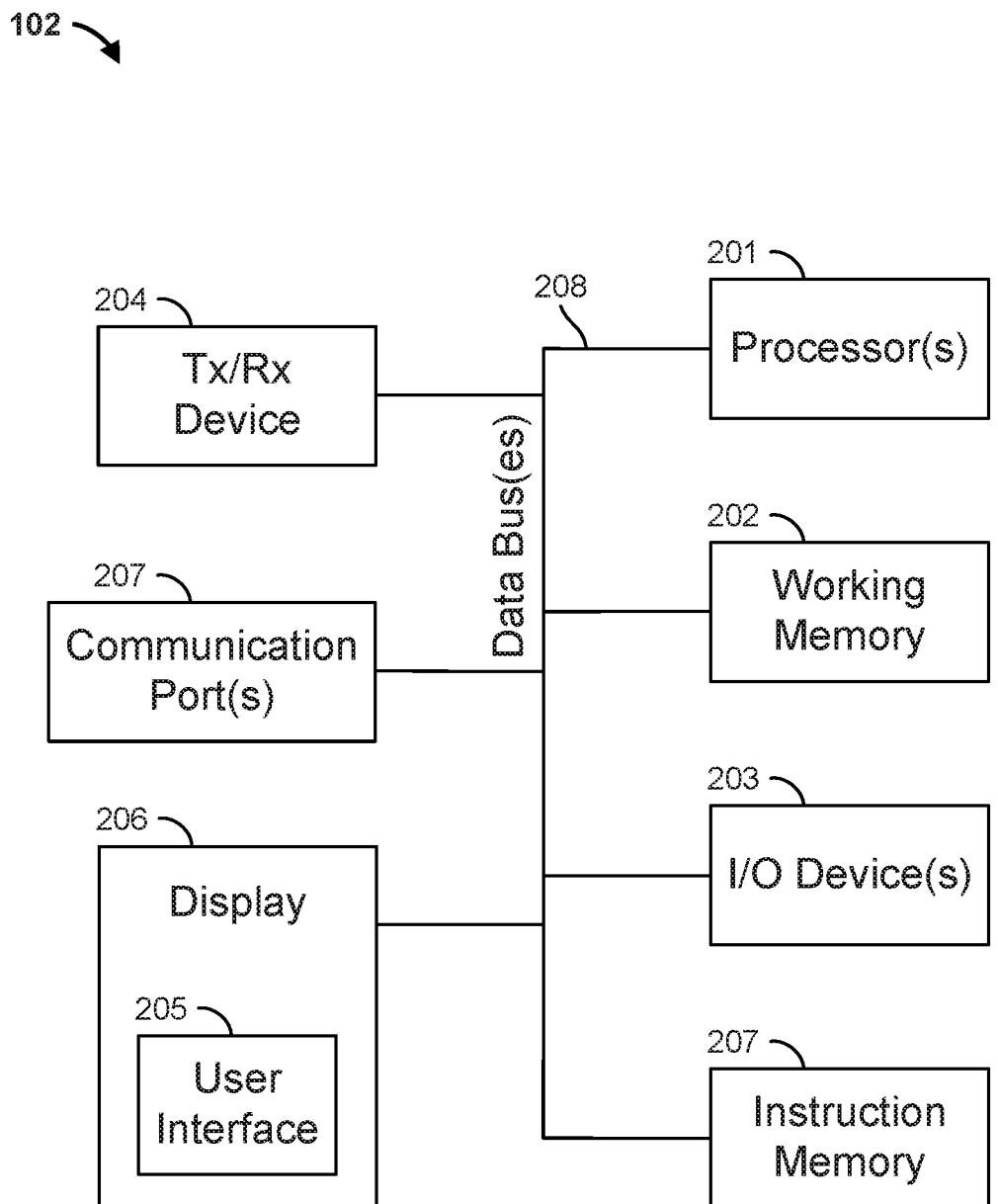
FIG. 2 illustrates an example of an object feature visualization computing device of the object feature visualization system of FIG. 1 in accordance with some embodiments.

FIG. 2 illustrates more details of object feature visualization computing device 102. As illustrated in FIG. 2, object feature visualization computing device 102 may include one or more processors 201, a working memory 202, one or more input/output devices 203, an instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processor(s) 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of object feature visualization computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, the communication port(s) 207 allows for the programming of executable instructions in instruction memory 207. In some examples, the communication port(s) 207 allow for the transfer (e.g., uploading or downloading) of data, such as material data stored about materials displays by the object feature visualization computing device 102.

Display 206 can display user interface 205. User interfaces 205 can enable user interaction with object feature visualization computing device 102. For example, user interface 205 can be a user interface for an application that allows for the viewing and manipulation of images of materials as well as material data. In some examples, a user can interact with user interface 205 by engaging input-output devices 203.

Transceiver 204 may be any suitable communication unit that allows for communication with a network, such as communication network 118 of FIG. 1. In some examples, transceiver 204 is selected based on the type of communication network 118 object feature visualization computing device 102 will be operating in. For example, if communication network 118 of FIG. 1 is a WiFi® network, transceiver 204 is configured to allow communications with the WiFi® network. Processor(s) 201 is operable to receive data from, or send data to, a network, such as communication network 118 of FIG. 1, via transceiver 204.

Turning back to FIG. 1, object feature visualization system 100 can simulate how objects (e.g., floors, walls, furniture, fixtures, items) may look with differing object features by video-mapping (e.g., 3D projection mapping) images onto the actual objects. Features may include, for example, materials (e.g., carpet, tile, wood), fabrics, colors, patterns, design elements, or any other object features. In some examples, object feature visualization system 100 allows for the virtual selection of a physical object in a physical room display. Object feature visualization system 100 may also allow for the selection of a particular feature for the selected object. Object feature visualization system 100 may generate an image based on the selected feature for the object, and video-map the generated image onto the physical object. For example, object feature visualization system 100 may project different colors, materials, finishes, or patterns onto a piece of furniture, a wall, and a floor of a mini-room display in real time. As an advantage, object feature visualization system 100 may allow a person to observe and visualize how a room would look with objects of the room incorporating varying features via video-map projections. For example, the objects being projected may accurately portray textures (e.g. carpet vs tile, fabric vs leather, different colors), shading or shadowing, and finishes in different lighting (e.g. daylight vs. night or evening light). Additionally, the objects being projected may portray various combinations of features for one or more objects. For example, object feature visualization system 100 may project a selected feature onto a piece of furniture and another selected feature onto a wall, and another selected feature onto flooring in a room display. In another example, object feature visualization system 100 may allow for the selection of more than one feature for a selected object, such as a first color, material, finish, or pattern for kitchen cabinets and a second color, material, finish or pattern for the countertops. The various features can be selected and changed by a user in real time. As such, object feature visualization system 100 may allow the person to make interior design choices by reviewing how the objects look with the various projected features.

In some examples, object feature visualization computing device 102 may cause one or more projectors 104A, 104B, 104C, etc. to project one or more video-mapped images onto one or more objects of room display 150. For example, room display 150 can include various objects, such as back wall 171, sidewall 175, floor 173, picture frame 152, chair 154, table 156, rug 158, shelving 160, and flower vase 162. The illustrated objects are merely exemplary and by no means limit the present disclosures.

In some examples, projectors 104A, 104B, 104C, etc. are preconfigured (e.g., oriented and positioned) to direct an image to a portion of room display 150. For example, projector 104A may be preconfigured to project a video-mapped image onto one or more of sidewall 175 and chair 154. Similarly, projector 104B may be preconfigured to project a video-mapped image onto one or more of rug 158, table 156, and portions of back wall 171; projector 104C may be preconfigured to project a video-mapped image onto one or more of portions of floor 173 and portions of back wall 171; projector 104D may be preconfigured to project a video-mapped image onto one or more of shelving 160 and flower vase 162; and projector 104E may be preconfigured to project a video-mapped image onto or more of portions of back wall 171 and floor 173. In some examples, object feature visualization computing device 102 can control a projection direction of each projector 104. For example, object feature visualization computing device 102 may be operable to send messages to each of the projectors 104 to control a direction and/or zoom of their corresponding image projections.

Object feature visualization computing device 102 may provide the video-mapped images to each of projectors 104A, 104B, 104C, etc. based on, for example, a selection of one or more features for each object. As an example, object feature visualization computing device 102 may receive a selection of a color, such as white, for chair 154. In response, object feature visualization computing device 102 may provide a video-mapped image that includes a white chair image to projector 104A to be projected onto chair 154.

Figure 3A:
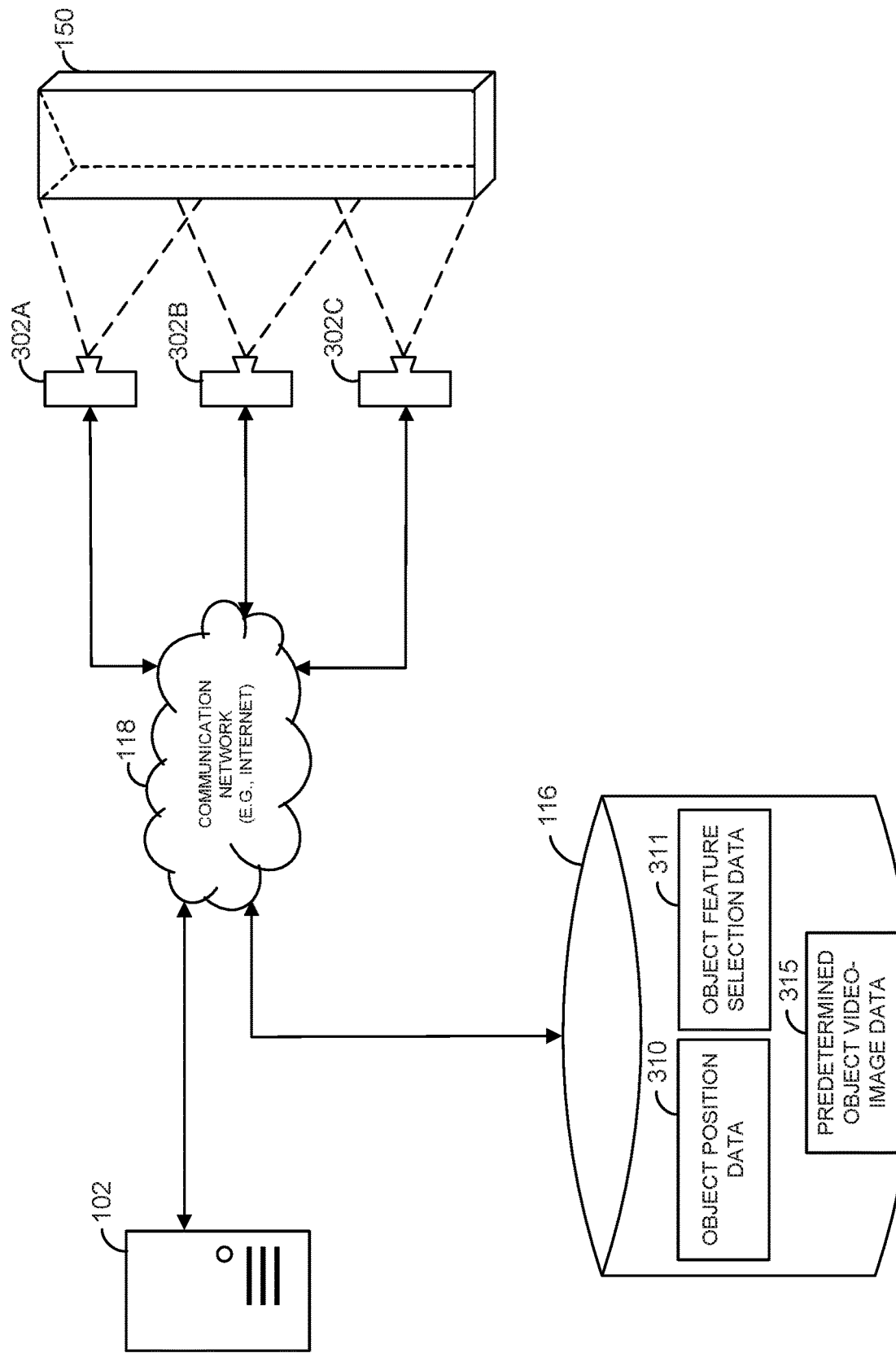
FIG. 3A illustrates exemplary portions of the object feature visualization system of FIG. 1 in accordance with some embodiments.

FIG. 3A illustrates exemplary portions of the object feature visualization system 100 of FIG. 1 that may determine objects in a scene, such as objects of room display 150. In this example, object feature visualization computing device 102 is communicatively coupled to a plurality of cameras via communication network 118. Specifically, object feature visualization computing device 102 is communicatively coupled to camera 302A, camera 302B, and camera 302C. Each of the cameras 302A, 302B, 302C may be a full-color camera configured to capture full-color images of a scene, video cameras, or any other suitable cameras. Although in this example three cameras 302A, 302B, 302C are illustrated, other examples may include fewer, or more, cameras 302. Each of cameras 302 may be configured to capture at least a portion of room display 150. For example, camera 302A may be configured to capture a left portion of room display 150, camera 302B may be configured to capture a middle portion of room display 150, and camera 302C may be configured to capture a right portion of room display 150. In some examples, the field of view of each of the cameras 302 may overlap, at least in part, with each other (as indicated in FIG. 3A by the dashed lines). In some examples, the field of view of each of the cameras do not overlap with each other.

In some examples, object position data 310 may be pre-stored in database 116. For example, the position of each object in room display 150 may be predetermined and stored in database 116. For example, object position data 310 may identify a position (e.g., outline) of each of a plurality of objects, such as sidewall 175, back wall 171, chair 154, and table 156.

In some examples, rather than or in addition to utilizing predetermined object position data 310, cameras 302 may be utilized in real-time to capture images and identify objects within the images. For example, object feature visualization computing device 102 may receive one or more images from one or more of the cameras 302, and identify objects in the images. To detect the objects, object feature visualization computing device 102 may employ any suitable object detection technique or process. For example, object feature visualization computing device 102 may employ one or more machine-learning based approaches, such as one that identifies features based on a histogram of oriented gradients (HOG) and includes a classifier to determine objects, to identify objects in the images. In some examples, object feature visualization computing device 102 may employ one or more deep-learning based approaches, such as one based on convolutional neural networks (CNN), to identify objects in the images. Based on the technique or process employed, object feature visualization computing device 102 may generate data identifying the position of each object within an image provided by a camera 302. For example, object feature visualization computing device 102 may generate coordinate data that identifies coordinates that include or outline an object within an image from a particular camera 302. In some examples, object feature visualization computing device 102 generates pixel data that identifies pixel positions that include or outline an object in an image.

Based on the detected objects from one or more cameras 302, object feature visualization computing device 102 generates object position data 310 identifying and characterizing the position of each detected object in room display 150. For example, object feature visualization computing device 102 may determine a position of each object in room display 150 based on the field of view of the camera that captured the image with the object (e.g., how much or what part of room display 150 is the camera 302 capturing), the data identifying the position of the object within the captured image, and dimensions of room display 150 (e.g., 3D dimensions such as total height, total length, and total width). Object feature visualization computing device 102 may store object position data 310 in database 116.

Based on object position data 310 for each predetermined or detected object, object feature visualization computing device 102 may generate a video-mapped image, and cause a corresponding projector 104 to project the video-mapped image onto the object. For example, based on object position data 310 for a particular object, object feature visualization computing device 102 may generate a video-mapped image that, when projected by a particular projector 104, will project onto only the physical object identified by object position data 310. The generated video-mapped image may include an overlay of the object with a selected feature (e.g., a different color, a different material, a different pattern, etc.).

For example, object feature selection data 312, which is stored in database 116, may identify features for each of a plurality of objects in room display 150. Object feature selection data 312 may be preconfigured and stored in database 116 by object feature visualization computing device 102, for example. As described below with respect to FIG. 3B, a user may select a feature, identified and characterized by object feature selection data 312, for a particular object. Based on the selected feature, object feature visualization computing device 102 may generate a video-mapped image to project onto the particular object that includes the selected feature (e.g., a color selected for a wall object, such as back wall 171). Object feature visualization computing device 102 may then cause a projector 104, such as one that is configured to project onto the particular object (e.g., projector 104C to project onto portions of back wall 171), to project the video-mapped image onto the particular object. In some examples, if more than one projector 104 is configured to project images onto an object (e.g., such as projectors 104B, 104C, 104E project on back wall 171), object feature visualization computing device 102 generates a video-mapped image for each such projector 104, where each of the generated video-mapped images include the feature.

In some examples, object feature visualization computing device 102 may generate a video-mapped image that, when projected by a particular projector 104, will project onto a plurality of objects. For example, the video-mapped image may include features selected for each object, such as a color or material for each object. In some examples, object feature visualization computing device 102 removes all brightness and color (e.g., luminance and chrominance) from portions of the video-mapped image that would project onto areas that do not fall on an object (e.g., areas in-between the objects).

Figure 3B:
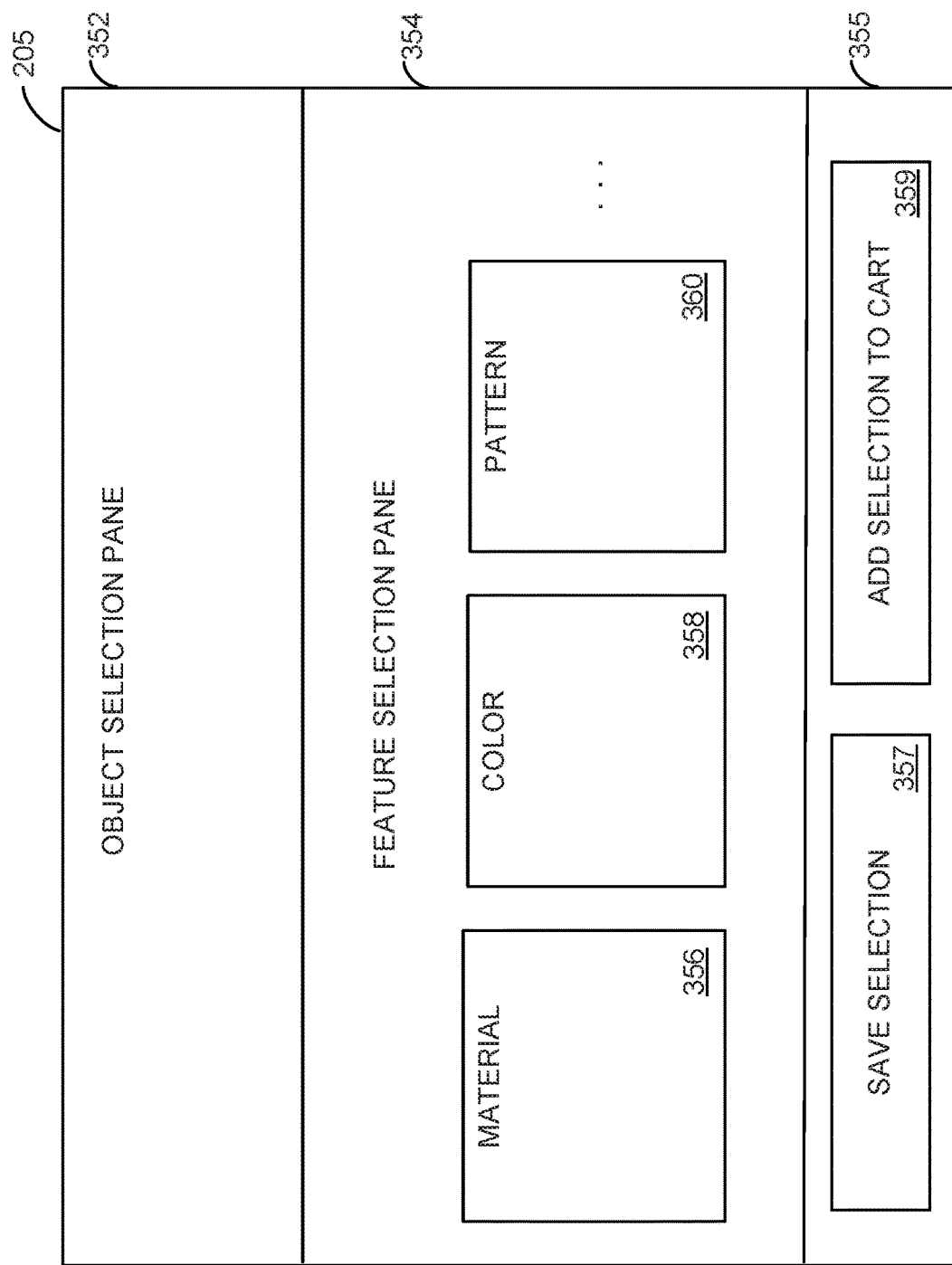
FIG. 3B illustrates an example user interface that may be provided by the object feature visualization computing device of FIG. 2 in accordance with some embodiments.

FIG. 3B illustrates an example user interface 205 that may be displayed, for example, on display 206 (as illustrated in FIG. 2) of object feature visualization computing device 102. For example, display 206 may be a touchscreen, where user interface 205 is displayed on the touchscreen and allows for user input based on user touch. In some examples, user input may be provided by one or more input/output devices 203. As illustrated in FIG. 3B, user interface 205 may include an object selection pane 352, a feature selection pane 354, and a user command pane 355.

Object selection pane 352 may display one or more objects of room display 150. In some examples, object selection pane 352 displays a selectable list of the objects (e.g., preconfigured objects, or objects object feature visualization computing device 102 detected in images received from cameras 302, as identified by object position data 310). By engaging (e.g., touching) at least a portion of a displayed object, a user may select the object.

In some examples, object selection pane 352 displays an image of room display 350. For example, object feature visualization computing device 102 may render an image based on images received from cameras 302, and display the rendered image in object selection pane 352. In some examples, an image of room display 350 is predetermined and stored in database 116 for display. The displayed image of room display 350 may allow a user to select one or more objects displayed in the image by, for example, engaging (e.g., touching) at least a portion of the object as displayed.

In this example, when a user selects an object, the feature selection pane 354 automatically updates with one or more feature categories and one or more possible features for each feature category that a user may select. For example, based on the selected object in object selection pane 352, feature selection pane 354 may display feature categories including materials 356, colors 358, and patterns 360. The displayed feature categories may be based on the type of object and possible features for that type of object. In addition, each feature category may include one or more features corresponding to that feature category, where a user can select a feature for each category for the object. Each feature category and corresponding features for each object may be identified and characterized by, for example, object feature selection data 312, which may be stored in database 116.

For example, assume that a user uses object selection pane 352 to select table 156 of room display 350. Feature selection pane 354 may then automatically update and display feature categories including materials 356, colors 358, and patterns 360. The user may then be able to select a material (e.g., wood or plastic) under materials 356, a color (e.g., white or black) under colors 358, and a pattern (e.g., flowers or ocean theme) under patterns 360. A user may also decide not to select a feature under a particular feature category. In that event, object feature visualization computing device 102 would generate a video-mapped image to project onto the object with only the selected features.

User command panel 355 may include a save selections icon 357. Save selections icon 357, if engaged (e.g., touched) by a user, causes object feature visualization computing device 102 to save the selected features for the selected object for the user. The selected features may be saved in database 116, for example, and may be associated with an account for the user.

In some examples, user command panel 355 may include an add selection to cart icon 359. Add selection to cart icon 359 facilitates a purchase of a selected object with the selected features by adding the object with the selected features to an online shopping cart.

In some examples, the online shopping cart may allow the user to place a purchase order for those items located added to the online shopping cart. In some examples, rather than placing a purchase order directly, the placement of the purchase order causes object feature visualization computing device 102 to transmit a communication to each manufacturer of each object in the online cart. The communication may be an electronic mail (email), a short message service (SMS) message, or any other suitable communication. The communication may identify the user, the object, and the selected features of the object. The communication may then allow the manufacturer, retailer, and/or one of their representatives to contact the user for sale of, or additional information about, the object with the selected features. In some examples, a communication is transmitted to the user with manufacturer, retailer, and/or other representative contact information.

Figure 4A:
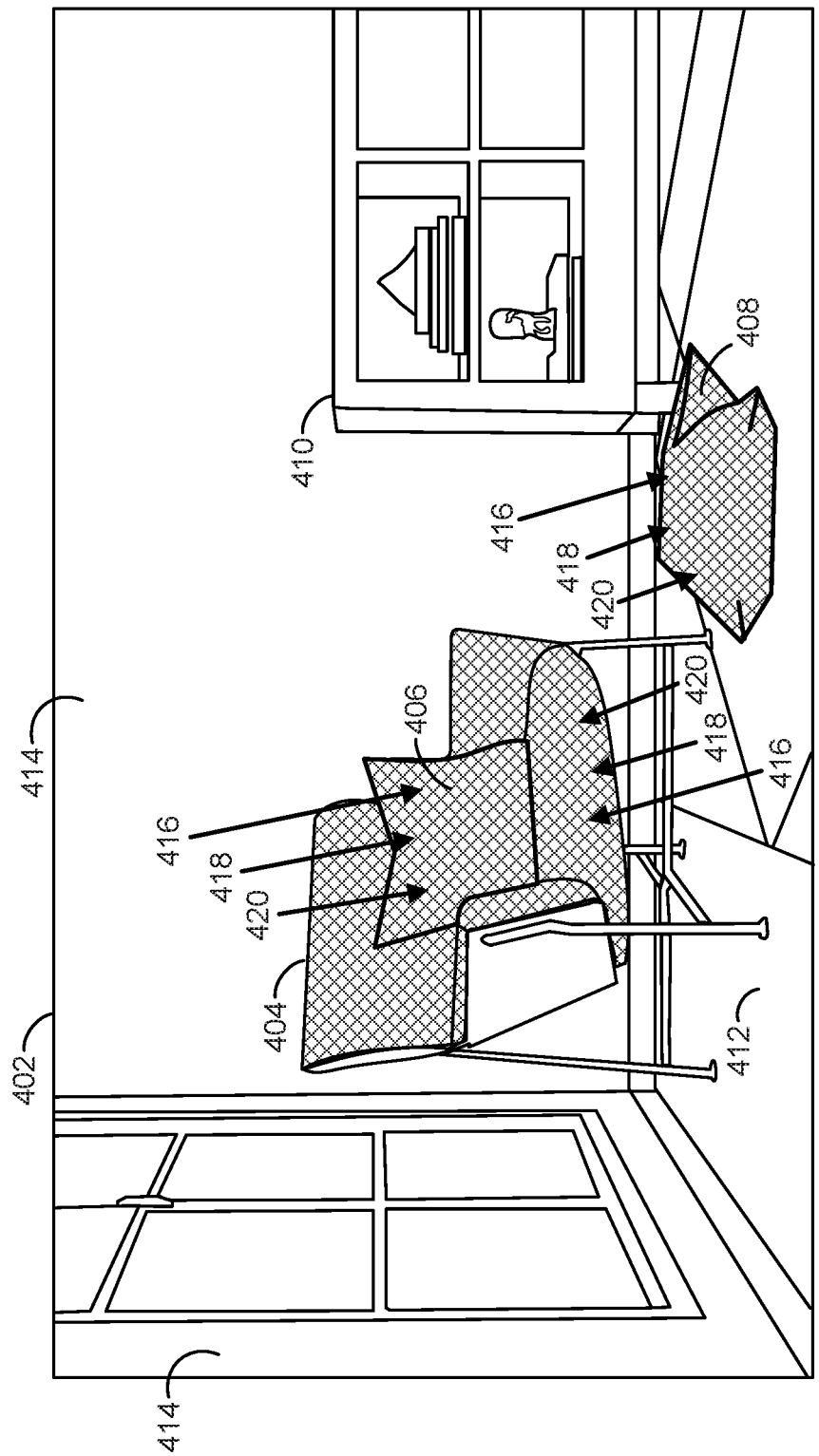
FIG. 4A illustrates an example of objects in a room display in accordance with some embodiments.

FIG. 4A illustrates a room display 402 from a point of view of a person physically standing in front of the room display 402. Room display 402 includes a plurality of objects in a room before the projecting of any video-mapped images by object feature visualization computing device 102 onto any of the objects. For example, room display 402 includes a chair 404, a first chair pillow 406, a second chair pillow 408, shelving 410, flooring 412, and walls 414, among other objects. The chair 404, first chair pillow 406, and second chair pillow 408 include a first material 416 with a first pattern 418 at a first color 420. In some embodiments, the first material 416, first pattern 418 and the first color 420 can be selected to allow for optimal projection of video-mapped images. For example, the first pattern 418 and first color 420 can be plain white, while the first material 416 can be selected from optimal display properties.

Figure 4B:
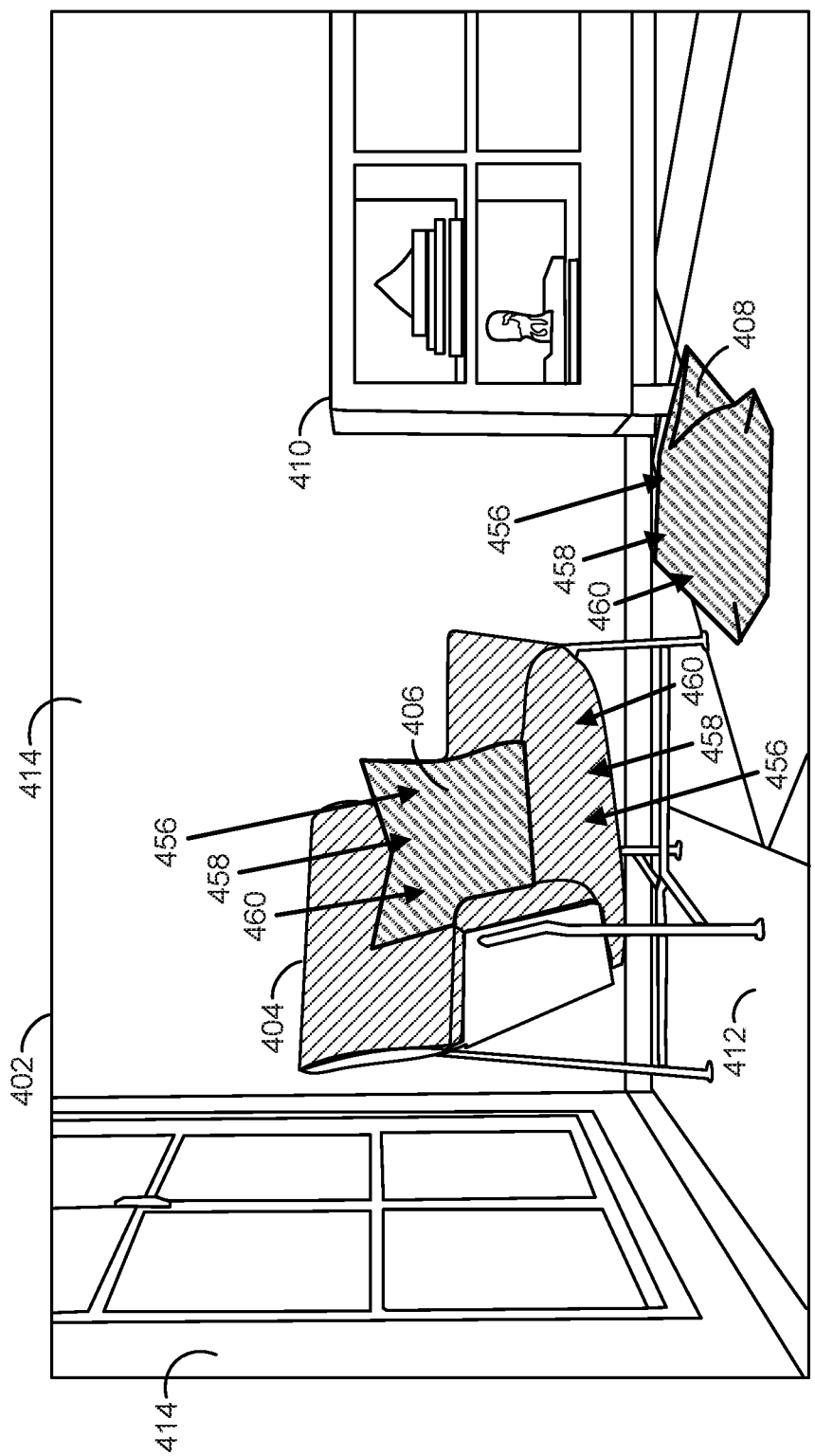
FIG. 4B illustrates example object feature visualizations of at least some of the objects in the room display of FIG. 4A in accordance with some embodiments.

FIG. 4B illustrates the same room display 402 of FIG. 4A, but with the projection of video-mapped images by object feature visualization computing device 102 onto chair 404, first chair pillow 406, and second chair pillow 408. For example, object feature visualization computing device 102 may display the objects in room display 402 (including chair 404, first chair pillow 406, and second chair pillow 408) on a user interface, such as user interface 205. The user may select chair 404, and the user interface may display categories of features for the chair 404. For example, the feature categories may include materials (e.g., materials 356), patterns (e.g., patterns 360), and colors (e.g., colors 358). The materials category may include selections for first material 416 and a second material 456. The patterns category may include selections for a first pattern 418 and a second pattern 458. The colors category may include selections for a first color 420 and a second color 460. The user may select a feature for one or more of the feature categories.

In this example, the user selects a second material 456, a second pattern 458, and a second color 460 for chair 404. In response, object feature visualization computing device 102 generates a video-mapped image based on object position data for chair 404 that includes second material 456, second pattern 458, and second color 460. Object feature visualization computing device 102 may provide the generated video-mapped image to a projector configured to project images onto chair 404, such as one of projectors 104. For example, when projector 104 projects video-mapped image onto chair 404, chair 404 would appear to an outside person physically observing room display 402 to have second material 456, second pattern 458, and second color 460, rather than first material 416, first pattern 418, and first color 420, as illustrated in FIG. 4B.

Similarly, the user may select first chair pillow 406, and the user interface may display categories of features for first chair pillow 406, where each category includes selectable features for the first chair pillow 406. In this example, the user selects, a second material 456, a second pattern 458, and a second color 460 for first chair pillow 406. In response, object feature visualization computing device 102 generates a video-mapped image based on object position data for first chair pillow 406 that includes second material 456, second pattern 458, and second color 460. Object feature visualization computing device 102 may provide the generated video-mapped image to a projector configured to project images onto first chair pillow 406, such as one of projectors 104.

The user may also select second chair pillow 408, and the user interface may display categories of features for second chair pillow 408, where each category includes selectable features for the second chair pillow 408. In this example, the user selects a second material 456, a second pattern 458, and a second color 460 for second chair pillow 408. In response, object feature visualization computing device 102 generates a video-mapped image based on object position data for second chair pillow 408 that includes second material 456, second pattern 458, and second color 460. Object feature visualization computing device 102 may provide the generated video-mapped image to a projector configured to project images onto second chair pillow 408, such as one of projectors 104.

Figure 5A:
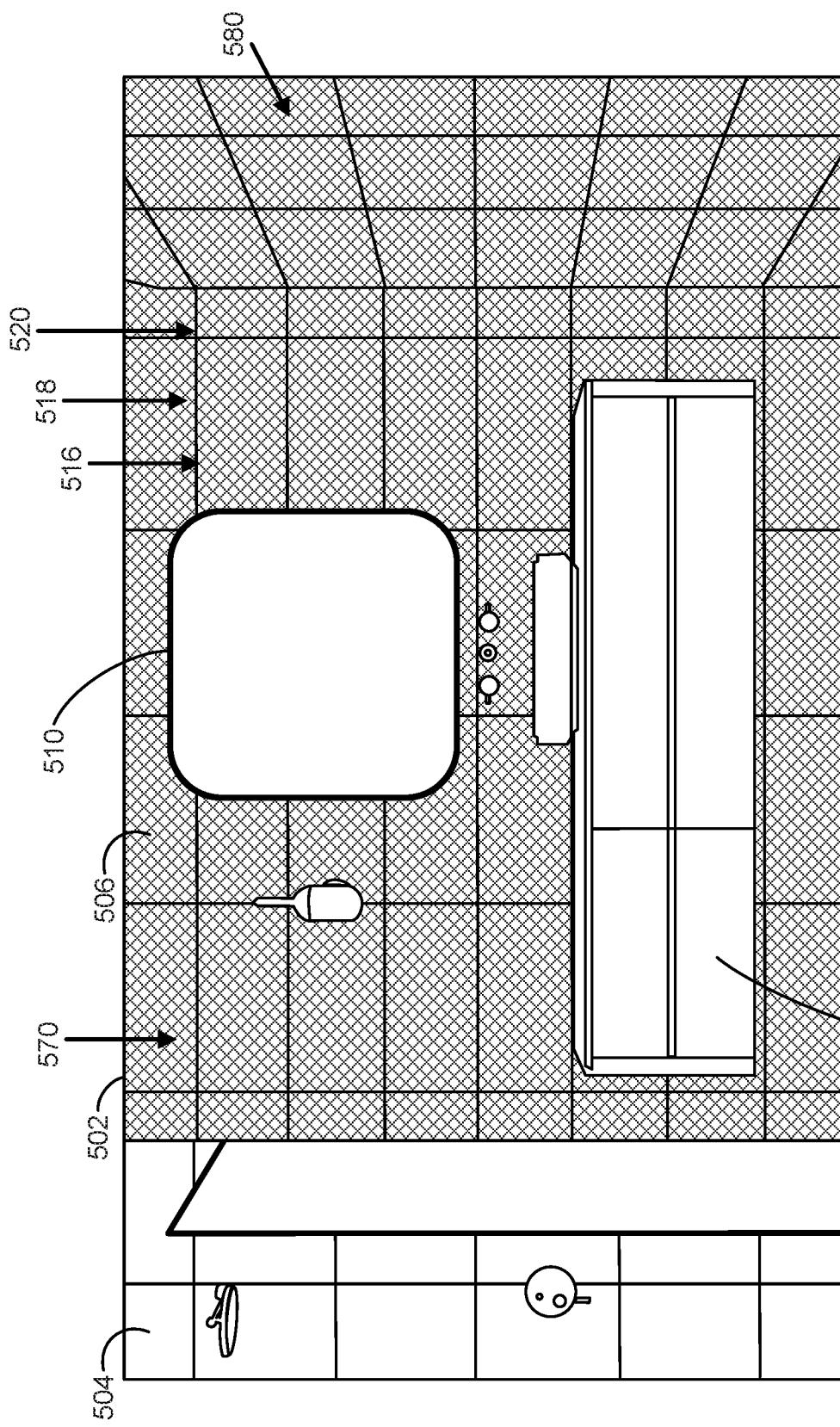
FIG. 5A illustrates an example of objects in a room display in accordance with some embodiments.

FIG. 5A illustrates a room display 502 from a point of view of a person physically standing in front of the room display 502. Room display 502 includes a plurality of objects in a room before the projecting of any video-mapped images by object feature visualization computing device 102 onto any of the objects. For example, room display 502 includes shower tile 504, wall tile 506, vanity 508, and frame 510, among other objects. The wall tile 506 includes a first material 516 with a first pattern 518 at a first color 520. In some embodiments, the first material 516, first pattern 518, and the first color 520 can be selected to allow for optimal projection of video-mapped images. For example, the first pattern 518 and first color 520 can be plain white and the first material 516 can be selected for optimal display properties.

Figure 5B:
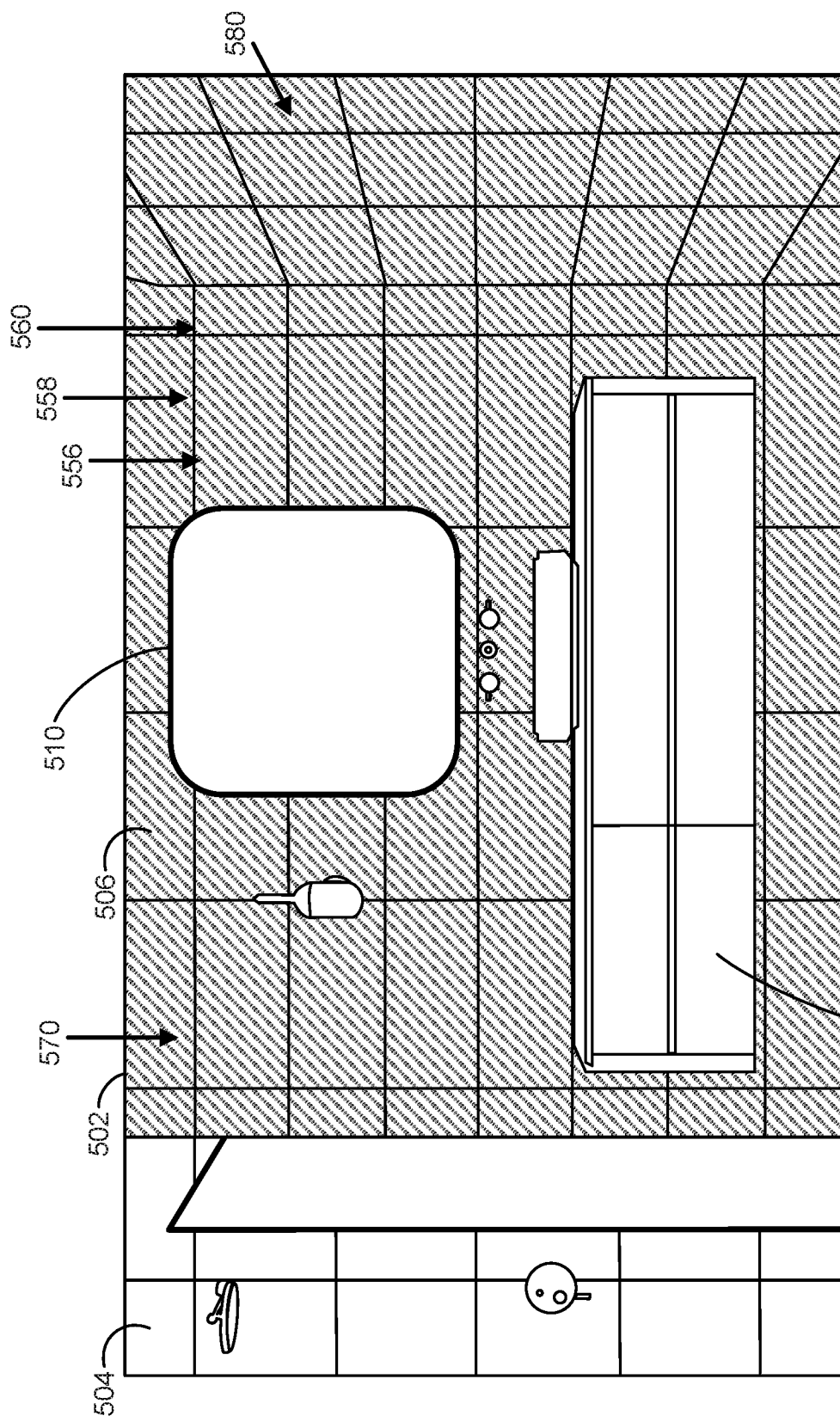
FIG. 5B illustrates example object feature visualizations of at least some of the objects in the room display of FIG. 5A in accordance with some embodiments.

FIG. 5B illustrates the same room display 502 of FIG. 5A, but with the projection of a video-mapped image by object feature visualization computing device 102 onto wall tile 506. For example, object feature visualization computing device 102 may display the objects in room display 502 (including wall tile 506) on a user interface, such as user interface 205. The user may select wall tile 506, and the user interface may display categories of features for the wall tile 506. For example, the feature categories may include materials (e.g., materials 356), patterns (e.g., patterns 360), and colors (e.g., colors 358). The materials category may include selections for first material 516 and a second material 556. The patterns category may include selections for first pattern 518 and a second pattern 558. The colors category may include selections for first color 520 and a second color 560. The user may select a feature for one or more of the feature categories.

In this example, the user selects, for wall tile 506, a color category feature of second color 560. The user does not select a material category feature or a pattern category feature. In response, object feature visualization computing device 102 generates video-mapped images based on object position data for wall tile 506 that includes second color 560. Object feature visualization computing device 102 may provide the generated video-mapped images to a plurality of projectors configured to project images onto wall tile 506, such as a plurality of projectors 104. For example, object feature visualization computing device 102 may generate a video-mapped image for a first projector that can project an image onto a back wall 570, and generate another video-mapped image for a second projector that can project an image onto a side wall 580. When first projector and second projector project the video-mapped images onto the respective portions of wall tile 506, wall tile 506 would appear to an outside person physically observing room display 502 to have second color 560 rather than first color 520, as illustrated in FIG. 5B.

In some examples, feature categories for materials can include by type of material (e.g. textile, paint, laminate, ceramic, wood, leather, stone, resin, film, glass, concrete, vinyl, rubber, cork, pearl and seashell, paper, etc.), by application (e.g. wallcovering, upholstery, flooring, carpet, trim, indoor, outdoor, commercial, residential, etc.), by other features (e.g. stain-resistant, waterproof, recycled content, low VOCs, etc.), and/or by brand name or manufacturer. Feature categories can also include color categories (e.g. grays, blues, reds, etc.) or pattern categories (e.g., stripes, animal prints, etc.). Feature categories can also include themes (e.g. Victorian, Art Deco, Rustic, Coastal, etc.).

Figure 6:
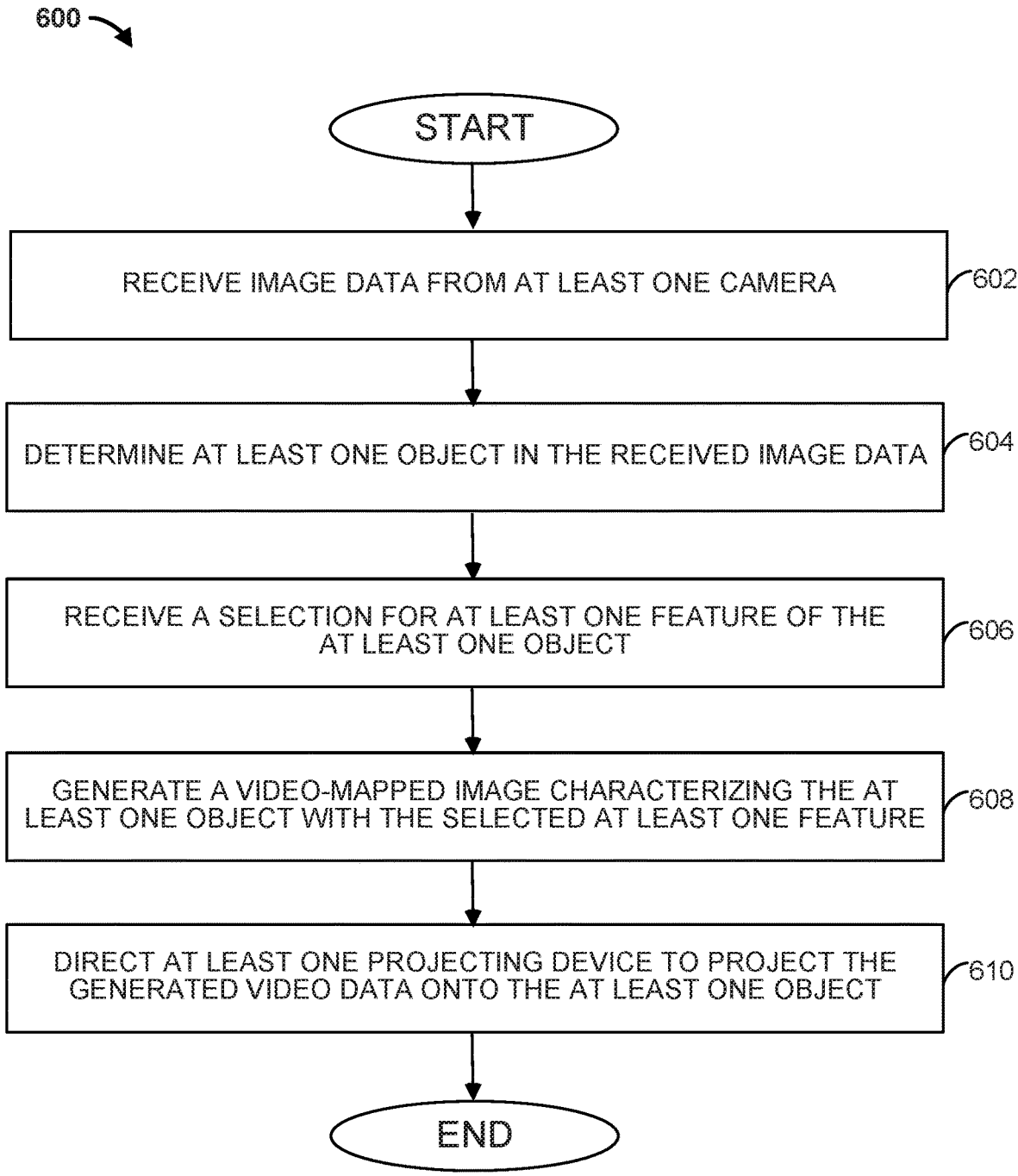
FIG. 6 illustrates an example method that may be performed by the object feature visualization system of FIG. 1 in accordance with some embodiments.

FIG. 6 illustrates a flowchart of an example method 600 that may be carried out by, for example, the object feature visualization computing device 102 of FIG. 1. Beginning at step 602, image data is received from at least one camera. For example, object feature visualization computing device 102 may receive image data from one or more cameras 302. At step 604, at least one object in the received image data is determined. For example, object feature visualization computing device 102 may execute one or more machine-learning or deep-learning based processes to identify at least one object in the image data received from cameras 302. Proceeding to step 606, a selection for at least one feature of the at least one object is received. As an example, object feature visualization computing device 102 may display a user interface 205 on display 206 allowing a user to select one or more features for the object, as described above with respect to FIG. 3B.

At step 608, a video-mapped image characterizing the at least one object with the selected at least one feature is generated. For example, object feature visualization computing device 102 may generate the video-mapped image based on the selected features such that, when projected on the physical object, the projected video-mapped image changes the appearance of the physical object in accordance with the selected features. Proceeding to step 610, at least one projecting device is directed to project the generated video-mapped data onto the at least one object. As an example, object feature visualization computing device 102 may provide the generated video-mapped image to a projector 104 configured to project images onto the corresponding physical object, such as the chair 154 located in room display 150. In some examples, object feature visualization computing device 102 may control the projector to adjust a direction and zoom of its image projection, such that the projector 104 will project the video-mapped image onto the corresponding physical object.

Figure 7:
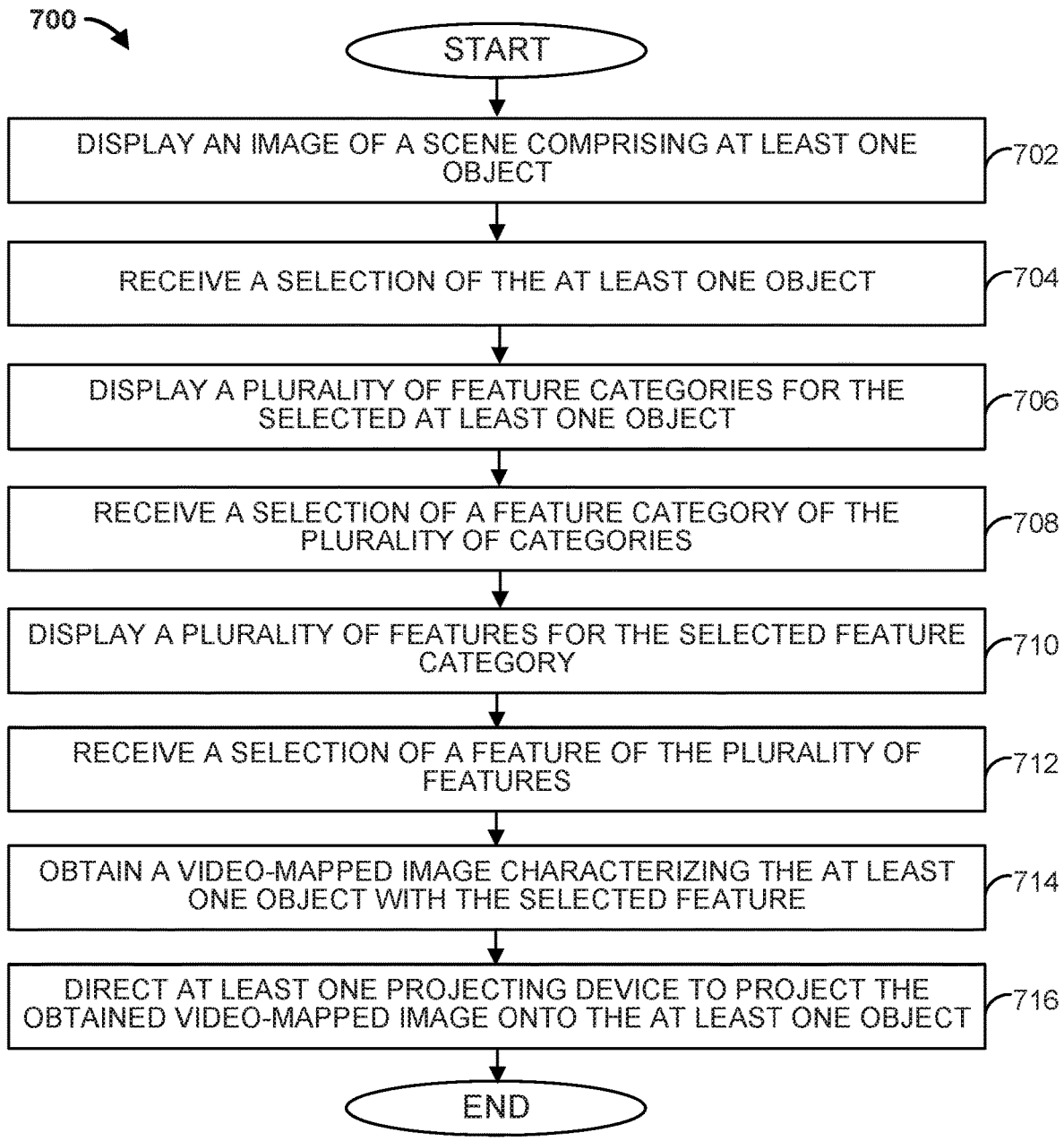
FIG. 7 illustrates another example method that may be performed by the object feature visualization system of FIG. 1 in accordance with some embodiments.

FIG. 7 illustrates a flowchart of another example method 700 that may be carried out by, for example, the object feature visualization computing device 102 of FIG. 1. Beginning at step 702, an image of a scene comprising at least one object is displayed. For example, object feature visualization computing device 102 may display a user interface 205 on display 206 that includes an object selection pane 352 that displays objects in room display 150, as described above with respect to FIG. 3B.

At step 704, a selection of the at least one object is received. As an example, object feature visualization computing device 102 may display user interface 205 on display 206 that includes an object selection pane 352 that allows the user to select an object, as described above with respect to FIG. 3B. At step 706, a plurality of feature categories for the at least one object are displayed. As an example, object feature visualization computing device 102 may display user interface 205 on display 206 that includes a feature selection pane 354 allowing the user to select one or more features for the object, as described above with respect to FIG. 3B.

At step 708, a selection of a feature category of the displayed plurality of feature categories is received. For example, the user may engage one of the plurality of feature categories displayed in feature selection pane 354 and, in response, object feature visualization computing device 102 receives the selected feature category. At step 710, a plurality of features for the selected feature category are displayed. For example, feature selection pane 354 may include a drop-down menu that displays features for the feature category when a user selects the feature category. At step 712, a selection of a feature of the displayed plurality of features for the selected feature category is received. For example, the user may select one of the features in the drop-down menu and, in response, object feature visualization computing device 102 receives the selected feature.

Proceeding to step 714, a video-mapped image is obtained based on the position. The video-mapped image includes image data characterizing the at least one object with the selected feature. For example, object feature visualization computing device 102 may obtain predetermined object video-image data 315 corresponding to the selected object and the selected features. Predetermined object video-image data 315 may have been previously generated and stored in database 116, for example. At step 716, at least one projecting device is directed to project the obtained video-mapped image onto the at least one object. For example, object feature visualization computing device 102 may provide the obtained video-mapped image to a projector 104 configured to project images onto the corresponding physical object, such as the back wall 171 located in room display 150. In some examples, object feature visualization computing device 102 may control the projector to adjust a direction and/or zoom of its image projection, such that the projector 104 will project the video-mapped image onto the corresponding physical object.

Figure 8:
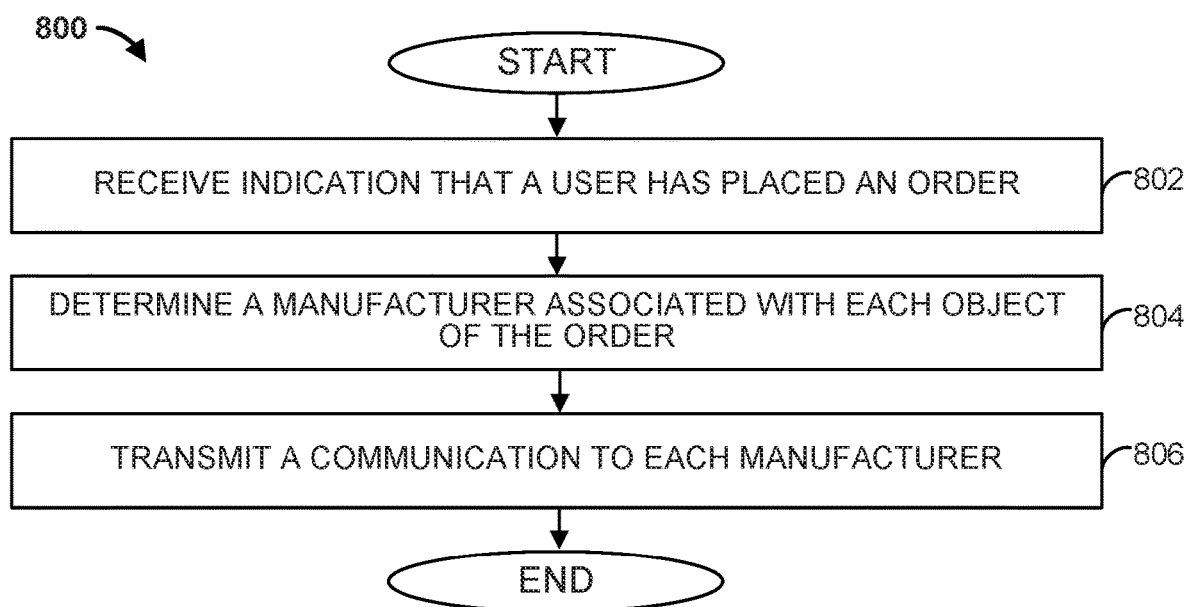
FIG. 8 illustrates yet another example method that may be performed by the object feature visualization system of FIG. 1 in accordance with some embodiments.

FIG. 8 illustrates a flowchart of another example method 800 that may be carried out by, for example, the object feature visualization computing device 102 of FIG. 1. Beginning at step 802, object feature visualization computing device 102 receives an indication that a user has placed an order (e.g., via an online shopping cart). The user may have placed the order for objects placed into the online shopping cart using the add selection to cart icon 359 of user interface 205. At step 804, in response to the indication, object feature visualization computing device 102 determines a manufacturer associated with each object in the online cart. For example, object feature visualization computing device 102 may determine each manufacture based on object data stored in database 116. The object data may include information about each object, including an identification of the manufacturer and, in some examples, available features for each object. At step 806, object feature visualization computing device 102 transmits a communication to each manufacturer of each object in the online cart. The communication may be an email, a SMS message, or any other suitable communication. Each communication may identify the user, each corresponding object, and any selected features for each object. The communication may allow each manufacturer to contact the user for the sale of, or additional information about, each object with the selected features.

In some examples, a computing device, such as object feature visualization computing device 102, includes at least one processor that is configured to receive first data identifying a selection of at least one feature for at least one object, and in response to receiving the first data, obtain a video-mapped image characterizing the at least one object with the at least one feature. The at least one processor is also configured to provide the video-mapped image to at least one projecting device, wherein the projecting device is configured to project the video-mapped image onto the at least one object.

In some examples, the at least one processor is further configured to receive image data from at least one camera, and determine the at least one object in the received image data based on applying one or more machine-learning or deep-learning based processes to the received image data. In some examples, the computing device determines the at least one object in the received image data based on applying a histogram of oriented gradients (HOG) to the received image data to identify features, and applying a classifier to the identified features to determine the at least one object.

In some examples, the at least one processor is configured to determine the at least one object in the received image data by generating position data identifying the position of each object within the received image data.

In some examples, the at least one processor is configured to provide the video-mapped image to at least one projecting device by generating the video-mapped image based on the position data. The computing device is also configured to store the video-mapped image in a database, such as database 116.

In some examples, the at least one processor is configured to provide for display object selection data identifying a plurality of objects, wherein each object corresponds to a physical object in a room display, and wherein the plurality of objects includes the at least one object. In some examples, the at least one processor is configured receive second data identifying a selection of the at least one object and, in response to the received second data, the at least one processor is configured to provide for display feature selection data identifying a plurality of features for the at least one object, wherein the plurality of features includes the at least one feature.

In some examples, the at least one processor is configured to receive third data identifying a selection of the at least one feature, where obtaining the video-mapped image characterizing the at least one object with the at least one feature includes selecting the video mapped image from a plurality of video-mapped images characterizing the at least one object based on the third data.

In some examples, a system includes a room display, a projecting device configured to project images to the room display, and a computing device communicatively coupled to the at least one projecting device. The computing device is configured to display an image of a scene including at least one object. The computing device is also configured to receive first data identifying a selection of the at least one object and, in response to the received first data, provide for display a plurality of feature categories for the at least one object. The computing device is further configured to receive second data identifying a selection of a first feature category of the plurality of feature categories and, in response to the received second data, provide for display a plurality of features corresponding to the first feature category. The computing device is also configured to receive third data identifying a selection of a first feature of the plurality of features corresponding to the first feature category and, in response to the received third data, obtain a video-mapped image characterizing the at least one object with the first feature. The computing device is further configured to provide the obtained video-mapped image to the projecting device.

In some examples, the computing device is configured to select the video-mapped image from a plurality of video-mapped images stored in a database based on the third data, each of the plurality of video-mapped images characterizing the at least one object with a varying feature.

In some examples, the computing device is configured to adjust a direction of the projecting device such that the projecting device projects the video-mapped image onto the at least one object.

In some examples, the at least one object includes walls, flooring, fixtures, furniture, décor, or other interior design elements. In some examples, the at least one feature for the at least one object is selected from at least one of: type of materials, colors, finishes, or patterns.

In some examples, the computing device is configured to receive image data from the projecting device, and determine the at least one object in the received image data based on applying one or more machine-learning or deep-learning based processes to the received image data.

In some examples, determining the at least one object in the received image data includes applying a histogram of oriented gradients (HOG) to the received image data to identify features, and applying a classifier to the identified features to determine the at least one object.

In some examples, determining the at least one object in the received image data includes generating position data identifying the position of each object within the received image data. In some examples, providing the video-mapped image to at least one projecting device includes generating the video-mapped image based on the position data. In some examples, the computing device stores the video-mapped image in a database.

In some examples, a method includes receiving first data identifying a selection of at least one feature for at least one object and, in response to receiving the first data, obtaining a video-mapped image characterizing the at least one object with the at least one feature. The method also includes providing the video-mapped image to at least one projecting device, where the projecting device is configured to project the video-mapped image onto the at least one object.

In some examples, the method includes receiving image data from at least one camera, and determining the at least one object in the received image data based on applying one or more machine-learning or deep-learning based processes to the received image data.

In some examples, the method includes applying one or more machine-learning or deep-learning based processes includes applying a histogram of oriented gradients (HOG) to the received image data to identify features, and applying a classifier to the identified features to determine the at least one object.

In some examples, determining the at least one object in the received image data includes generating position data identifying the position of each object within the received image data.

In some examples, providing the video-mapped image to at least one projecting device includes generating the video-mapped image based on the position data. In some examples, the method includes storing the video-mapped image in a database.

Although the methods described above are with reference to the illustrated flowcharts, it will be appreciated that many other ways of performing the acts associated with the methods can be used. For example, the order of some operations may be changed, and some of the operations described may be optional.

In addition, the methods and systems described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A visualization system for simulating how surfaces look with differing design materials, comprising:
   a first wall;
   a second wall;
   a floor;
   projecting devices configured to project images onto the first wall, the second wall, and the floor; and
   a computing device communicatively coupled to the projecting devices and configured to:
   receive a selection of a design material for a surface comprising at least a portion of the first wall, the second wall, or the floor;
   select an image of the design material;
   map the image to the surface to generate a mapped image of the surface with the design material;
   reduce brightness and color from a portion of the mapped image corresponding to an area next to an object onto which the mapped image is mapped; and
   simulate how the surface looks with the design material by using the projecting devices to project the mapped image onto the surface.

2. The visualization system of claim 1, wherein projection of the mapped image includes a texture.

3. The visualization system of claim 2, wherein the texture is that of:
   carpet;
   tile;
   wood;
   fabric; or
   leather.

4. The visualization system of claim 1, wherein projection of the mapped image includes shading.

5. The visualization system of claim 1, wherein projection of the mapped image includes shadowing.

6. The visualization system of claim 1, wherein projection of the mapped image includes one of a set of different lightings.

7. The visualization system of claim 6, wherein the set of different lightings comprises daylight lighting, night lighting, or evening lighting.

8. A visualization system for simulating how surfaces look with differing design materials, comprising:
a first wall;
a second wall;
a floor;
projecting devices configured to project images onto the first wall, the second wall, and the floor; and
a computing device communicatively coupled to the projecting devices and configured to:
receive a first selection of a first design material for a first surface comprising at least a first portion of the first wall, the second wall, or the floor;
receive a second selection of a second design material for a second surface comprising at least a second portion of the first wall, the second wall, or the floor;
select a first image of the first design material;
select a second image of the second design material;
map the first image to the first surface to generate a first mapped image of the first surface with the first design material;
map the second image to the second surface to generate a second mapped image of the second surface with the second design material;
reduce brightness and color from a portion of at least one of the first mapped image or the second mapped image corresponding to an area next to an object onto which the first mapped image or the second mapped image is mapped;
simulate how the first surface looks with the first design material by using at least a first projecting device of the projecting devices to project the first mapped image onto the first surface; and
simulate how the second surface looks with the second design material by using at least a second projecting device of the projecting devices to project the second mapped image onto the second surface.

9. The visualization system of claim 8, wherein:
the first projecting device of the projecting devices is oriented to project onto at least the first wall; and
the second projecting device of the projecting devices is oriented to project onto the floor.

10. The visualization system of claim 8, wherein:
the first projecting device of the projecting devices is oriented to project onto at least the first wall;
the second projecting device of the projecting devices is oriented to project onto the second wall; and
the first wall and the second wall define a corner.

11. The visualization system of claim 8, wherein:
the first design material comprises a wallcovering; and
the second design material comprises a flooring.

12. The visualization system of claim 8, wherein the computing device is further configured to:
receive a third selection of a third design material for a third surface comprising at least a third portion of the first wall, the second wall, or the floor;
select a third image of the third design material;
map the third image to the third surface to generate a third mapped image of the third surface with the third design material; and
simulate how the third surface looks with the third design material by using at least a third of the projecting devices to project the third mapped image onto the third surface.

13. The visualization system of claim 12, wherein the first design material and the third design material are formed of different materials or fabrics or have different colors, finishes, or patterns.

14. The visualization system of claim 8, wherein the first design material is a three-dimensional design material.

15. A method for simulating how surfaces look with differing design materials, comprising:
receiving a selection of a design material for a surface comprising at least a portion of a first wall, a second wall, or a floor;
selecting an image of the design material;
mapping the image to the surface to generate a mapped image of the surface with the design material;
reducing brightness and color from a portion of the mapped image corresponding to an area next to an object onto which mapped image is mapped by a group of projecting devices; and
simulating how the surface looks with the design material by using the group of projecting devices to project the mapped image onto the surface.

16. The method of claim 15, further comprising obtaining the image from a database.

17. The method of claim 15, wherein:
the surface is a first surface;
the design material is a first design material;
the portion of the first wall, the second wall, or the floor comprises a first portion of the first wall, the second wall, or the floor; and
the method further comprises:
receiving a second selection of a second design material comprising at least a second portion of the first wall, the second wall, or the floor;
selecting a second image of the second design material;
mapping the second image to the second portion of the first wall, the second wall, or the floor to generate a second mapped image of the second portion of the first wall, the second wall, or the floor with the second design material; and
simulating how the second portion of the first wall, the second wall, or the floor looks with the second design material by using at least one projecting device of the group of projecting devices to project the second mapped image onto the second portion of the first wall, the second wall, or the floor.

18. The method of claim 15, further comprising:
capturing a simulation image of the surface with the mapped image projected onto the surface; and
providing the simulation image to a display device.

19. The method of claim 15, wherein mapping the image to the surface to generate the mapped image comprises:
generating coordinate data that identifies coordinates for the surface;
generating pixel data that identifies pixel positions in the image; and
mapping the pixel positions to the coordinates.

20. The method of claim 15, further comprising removing at least a portion of color from at least a portion of the mapped image prior to using the group of projecting devices to project the mapped image onto the surface.

* * * * *